United States Patent [19]

Rozek

[11] 4,027,216
[45] May 31, 1977

[54] CONTROL DEVICE FOR A SYNCHRONOUS MOTOR

[75] Inventor: Ivan E. Rozek, Cleveland Heights, Ohio

[73] Assignee: Portec, Inc., Cleveland, Ohio

[22] Filed: Aug. 1, 1975

[21] Appl. No.: 601,078

[52] U.S. Cl. .............................. 318/176; 318/183; 318/193
[51] Int. Cl.² ........................................ H02P 1/46
[58] Field of Search ........... 318/167, 176, 183, 193

[56] References Cited

UNITED STATES PATENTS

| | | | |
|---|---|---|---|
| 3,020,463 | 2/1962 | MacGregor | 318/183 X |
| 3,048,755 | 8/1962 | Leonhard | 318/176 X |
| 3,308,362 | 3/1967 | Neumann et al. | 318/183 X |
| 3,354,368 | 11/1967 | Williamson | 318/176 |
| 3,381,196 | 4/1968 | Larose | 318/176 |
| 3,867,677 | 2/1975 | Fletcher et al. | 318/176 |

*Primary Examiner*—Gene Z. Rubinson
*Attorney, Agent, or Firm*—Meyer, Tilberry & Body

[57] ABSTRACT

A control device for a synchronous motor including a field winding discharge circuit having an alternating current when the synchronous motor has any slip and a field winding D.C. excitation circuit. The control device includes a digital counter for creating an output signal when the counter has counted a selected number of pulses during a given counting interval. The control circuit includes a means for creating counting pulses having a set frequency, means for directing the counting pulses to the counter, means responsive to the slip induced current in the discharge circuit for periodically resetting the counter and means responsive to the creation of an output signal between resetting operations for activating the excitation circuit. In this manner, if there is slip the synchronous motor operates in an induction mode until the slip is at a selected low level determined by the counter setting and the frequency of the pulses to the counter. During low slip conditions, the D.C. excitation circuit is repeatedly energized in an attempt to bring the synchronous motor into synchronous operation. When zero slip is experienced, the excitation circuit remains energized for continued operation in the synchronous mode.

24 Claims, 9 Drawing Figures

CONTROL LOGIC

CONTROL DEVICE FOR A SYNCHRONOUS MOTOR

The present invention relates to the art of synchronous motors and more particularly to a controlled device for shifting a synchronous motor between induction operation and synchronous operation in response to a slip of the motor.

The present invention relates to a synchronous motor of the brushless type wherein the D.C. excitation circuit of the synchronous motor is mounted on the rotor and it will be described with particular reference thereto; however, the invention has broader applications and may be used in various synchronous motor designs.

BACKGROUND OF INVENTION

In a synchronous motor the starter is provided with windings to carry a rotating alternating field and the rotor includes a field winding energized by a direct current source. During normal operation, the rotor is rotating at a speed corresponding to the rotational speed of the field created within the stator windings. Such a synchronous motor should operate with the rotor rotating at the same speed as the rotating field of the stator, i.e. zero slip or locked; therefore, during start up the rotor has to be accelerated from rest or some subsynchronous speed to the speed of the rotating field of the stator. For this reason, it is somewhat common practice to start a synchronous motor by converting to an induction mode of operation. To do this, a field winding of the rotor is provided with a discharge resistance circuit. By removing the D.C. excitation to the field winding and using the discharge circuit for induced current flow, the field winding is connected in accordance with an induction mode. In this mode of operation, a high starting torque can be created and a torque to force the motor into synchronization is possible. Various control arrangements have been used for shifting from the synchronous mode with the field winding excited by a D.C. source and an induction mode with the field winding provided with a discharge circuit. These prior attempts have been quite complex and somewhat difficult to predict and control. It is necessary to shift from the induction mode to the synchronous mode when the motor is experiencing a relatively low slip between the rotating field of the stator and the rotational movement of the rotor. This generally involves two separate circuits, one for measuring, in some manner, the low slip condition and one for measuring, in some manner, the zero slip condition. These two separate circuits must be coordinated to assure that when the motor is slipping, the induction mode is applied. In addition, when there is a zero slip condition due to a reluctance torque, the motor must be locked into the synchronous mode of operation with D.C. current in the field and maintained therein.

THE INVENTION

The present invention relates to an improved control circuit for a synchronous motor and more particularly for a synchronous motor of the brushless type wherein the excitation D.C. source is provided by a generator having coils mounted on the rotor of the motor. The present invention is used for switching a motor automatically between the synchronous and induction modes so that the induction mode is used when introduction torque is required to bring the motor into synchronization.

On start up, the rotor windings are shorted through a discharge circuit including a certain amount of resistance. This places the motor in the induction mode. When the motor reaches synchronous speed, the circuit in accordance with the present invention senses the synchronization and causes the D.C. current from the exciter on the rotor to pass through the field winding of the rotor and place the motor in the synchronous mode of operation. During operation, if the load is large enough to break the synchronous lock, the present invention senses the slip created by this break and shifts the motor back into the induction mode of operation wherein the D.C. excitation source is disconnected and the field winding is again shorted through the discharge circuit. When synchronous speed is again reached, the present invention reestablished the D.C. source from the rotor mounted excitation circuit and allows the motor to continue operation in the synchronous mode.

In accordance with the present invention, there is provided a control device for a synchronous motor as outlined above and comprising a digital counting means for creating an output signal when the counter means has counted to a select number of pulses during a counting interval, means for creating counting pulses having a set frequency, directing means for directing the counting pulses to the counting means, resetting means responsive to one of the half cycles of an induced sense signal from the shorted discharge circuit, whereby the resetting means terminates the counting interval of the counting means, and means responsive to the lack of this one half cycle to allow the counter means to continue to count toward the selected number. When the selected number has been reached, a control means responsive to the output signal from the counter means activates the D.C. excitation circuit of the rotor for shifting from the induction mode back to the synchronous mode.

By using this invention, during start up a current is induced by slip into the discharge circuit of the rotor winding. This blocks the D.C. excitation circuit by reverse biasing to non-conduction the control SCRs and commences operation of the motor in an induction mode. During the induction mode, a sensing signal is created in the discharge circuit. This sensing signal is an alternating signal having a period controlled by the slip frequency of the motor. As the period of the sense signal increases, the counting interval determined by successive negative half cycles increases. At some time, which is set to correspond to a selected slip amount, the counting interval, i.e. time between successive negative half cycles, is sufficiently long to allow a time out or a count out of the counter. When this happens, the control device attempts to place the motor into synchronous operation by providing a turn on signal to the SCRs controlling the D.C. excitation circuit. If the slip has not been reduced to zero, the induced current continues to flow within the shorted discharge circuit of the field winding. This current will again commutate the SCRs of the D.C. excitation circuit and cause counting in a subsequent counting interval. When the counter again counts out, the D.C. excitation circuit will again be actuated. This repeated actuation is continued until the motor is forced into zero slip. When this happens, the period of the sensing signal is infinite since there is no longer an alternating signal in the shorted discharge circuit. The counter then counts to a high level which indicates zero slip and again reactivates the SCRs of the D.C. exciter circuit to assure that they are operating to place a D.C. current through the field winding of the rotor. When this happens, there is no slip induced current in the field winding to again commutate the SCRs. Thus, the D.C. exciting field continues and the motor remains in synchronous mode.

In accordance with another aspect of the invention, after reaching the synchronous mode with zero slip, the control circuit, as explained above, is deactivated to prevent a drain of current or overworking of the control circuits. The D.C. exciter source is continued in operation until slip is experienced by overloading the motor or by any other adverse condition. When this happens, the slip induced voltage within the field winding of the rotor again commutates the SCRs controlling the D.C. excitation circuit and initiate the control device of the present invention. This control device then operates until zero slip has been reestablished which may require removal of the condition which has caused the motor to shift into a slip condition.

In accordance with another aspect of the present invention, when zero slip is first detected, the excitation circuit controlling SCRs are repeatedly gated. In this manner, if the no slip induction condition is obtained with the wrong pole alignment, the short induced current caused by a shift to the proper poles will commutate the SCRs, but the next gating pulse will reestablish synchronous operation.

The primary object of the present invention is the provision of a control device for a synchronous motor, which device automatically shifts between induction mode and synchronous mode and is dependable and uniform in operation.

Another object of the present invention is the provision of a control device for a synchronous motor, which device can be mounted on the rotor of a brushless synchronous motor.

Another object of the present invention is the provision of a control device for a synchronous motor, which control device uses a digital counter and combines a low slip and zero slip responsive arrangement controlled by the counter.

Still a further object of the present invention is the provision of a control device, as defined above, which combines a turn off function for the device, which function is controlled by the digital counter.

Still a further object of the present invention is the provision of a control device for a synchronous motor which is disconnected when not in use.

Yet another object of the present invention is the provision of a control device for a synchronous motor, which device provides at least two successive gating signals when converting from induction operation to synchronous operation at zero slip.

These and other objects and advantages will become apparent from the following description taken together with the accompanying drawings.

DESCRIPTION OF PREFERRED EMBODIMENT

Figure 1:
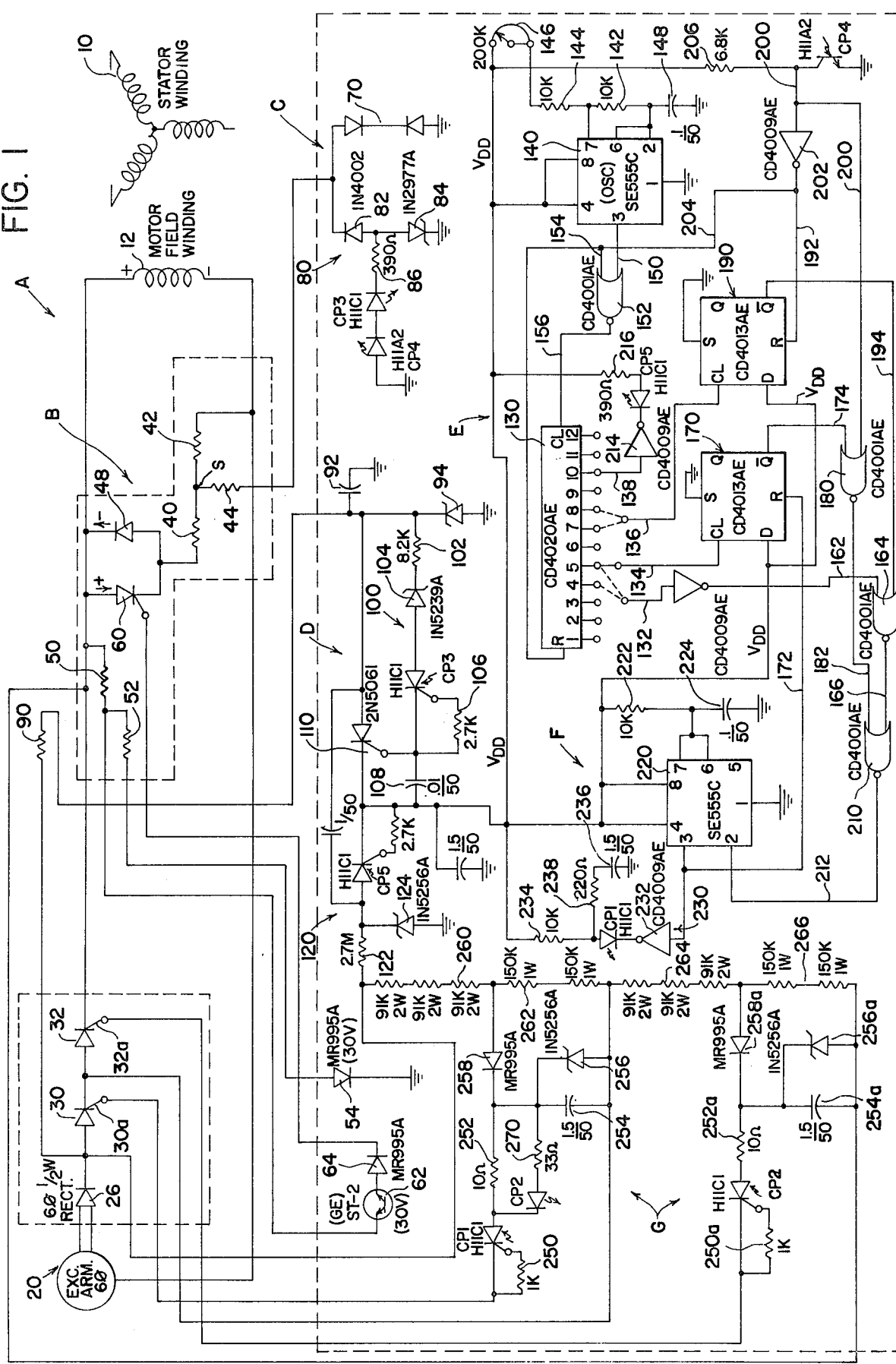
FIG. 1 is a wiring diagram illustrating the preferred embodiment of the present invention.
Figure 2:
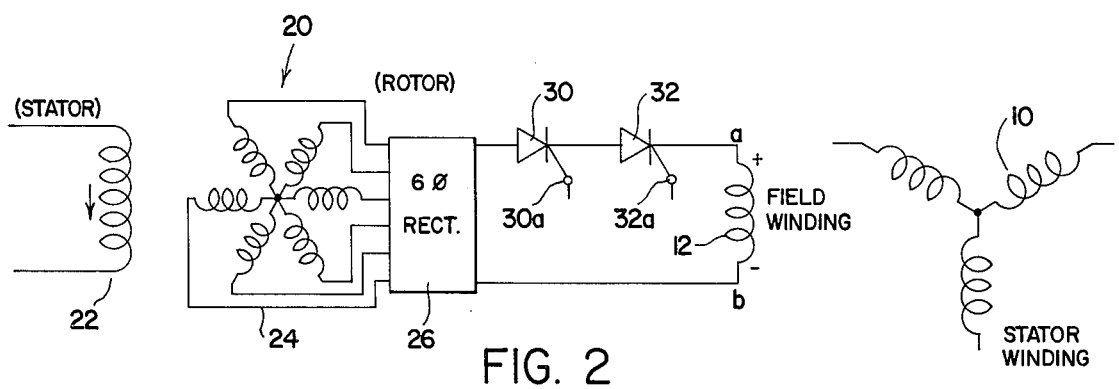
FIG. 2 is a schematic diagram showing the D.C. exciter circuit and the SCR controls therefor.

Referring now to the drawings wherein the showings are for the purpose of illustrating the preferred embodiment of the invention only and not for the purpose of limiting same, FIG. 1 shows a synchronous motor circuit A wherein the normal stator winding 10 and normal rotor field winding 12 are schematically illustrated. The synchronous motor using the circuit of FIG. 1 is of the brushless type and includes a six phase excitation armature circuit 20 better illustrated in FIG. 2. This excitation circuit is used for passing a direct current through rotor field winding 12 during the synchronous operation of the synchronous motor and includes a D.C. stator winding 22 located on the stator and controlled by the normal power switches of the synchronous motor, a six phase exciter winding 24 and a six phase rectifier 26. Of course, other types of arrangements could be provided for producing a D.C. current for passage through field winding 12 during synchronous operation of the synchronous motor. To allow passage of the D.C. current, there are provided two SCRs 30, 32 having appropriate gates 30a, 32a, respectively. Of course, one SCR may be used in some circumstances or more than two SCRs could be used for controlling the passage of D.C. current from the excitation circuit to the field winding 12. The use of two SCRs reduces the reverse voltage limiting necessary for each of the SCRs in the illustrated embodiment of the invention. During normal synchronous operation, the SCRs are conductive and a D.C. source is applied across winding 12 located on the rotor of the brushless synchronous motor. The discharge circuit B is used to allow flow of slip induced alternating current through field winding 12 when there is slip between the rotor and the rotation fields within stator winding 10. When this happens, the back emf created by slip induced current within field winding 12 commutates SCRs 30, 32 to a nonconductive condition and allows circulating current through the discharge circuit B for induction operation of the motor. When this happens, a sense circuit C receives an alternating signal from the discharge circuit B, which alternating signal has a period controlled by the slip frequency of the synchronous motor and two alternate half cycles. As the slip increases, the slip frequency increases and the period between successive positive or negative half cycles decreases. The use of this alternating sense signal will be described in more detail later. Sense circuit C forms a part of the control device for shifting the motor operation between induction and synchronous operation as determined by the signal received from the discharge circuit B. During operation, the control device, which is generally set forth in the lower dashed lines of FIG. 1, receives appropriate power ($V_{DD}$) from a power supply and on-off switching circuit D. When a signal is received by sense circuit C, the switching circuit D turns the control device on. Thereafter, a digital counter and logic circuit E determines the operation of the control device. The output of the digital counter and logic circuit actuates a trigger circuit F which, in turn, actuates a current source and SCR switching circuit G to provide a gating signal on gates 30a, 32a for rendering the SCRs conductive in the D.C. excitation circuit. Various components, the functions of which were briefly described above will be set forth in detail in the following sections.

FIELD WINDING DISCHARGE CIRCUIT

Figure 3:
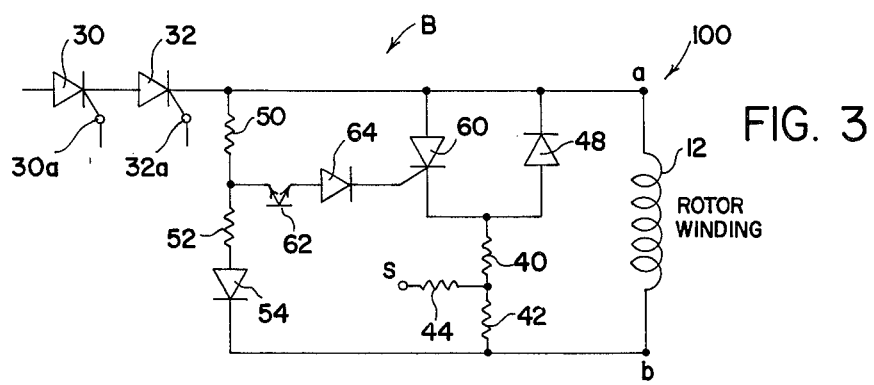
FIG. 3 is a schematic wiring diagram illustrating the discharge circuit for the field winding of the rotor, as used in the preferred embodiment of the present invention.

The field winding discharge circuit B is best shown in FIG. 3 and includes two parallel discharge branches between points a, b and across field winding 12. Under normal synchronous operation, point a is positive and point b is negative. When a voltage is induced into winding 12 by slip between the rotor and the rotating field of stator winding 10, an alternating current is imposed across points a, b. During the negative half cycle, current flows through a voltage divider including resistors 40, 42 and diode 48, poled as shown in FIGS. 1 and 3. At sense point S on the out board side of resistor 44, a negative half cycle is imposed during the flow of current in the direction indicated. During the positive half cycle on the induced alternating current, point a is positive and point b is negative. This applies a voltage across resistors 50, 52 and diode 54. Since the voltage induced by slip of the rotor is relatively high compared to the normal synchronous D.C. voltage, the SCR 60 is gated by the break down voltage of diac 62 through diode 64. At that time, current flows through gated SCR 60 and resistors 40, 42. Sense point S then receives a positive half cycle for the sense signal. During operation, when slip is created within the motor, the voltage induced within winding 12 creates an alternating sense signal at point S. This sense signal will continue until the slip of the motor is zero; however, the period of the signal will vary according to the amount of slip being experienced by the motor. As substantial slip is experienced, the slip frequency is high and the period of the sense signal is low. This slip induced voltage is substantially greater than the voltage from excitation circuit 20 and commutates SCRs 30, 32 into nonconduction.

SENSE CIRCUIT

Figure 4:
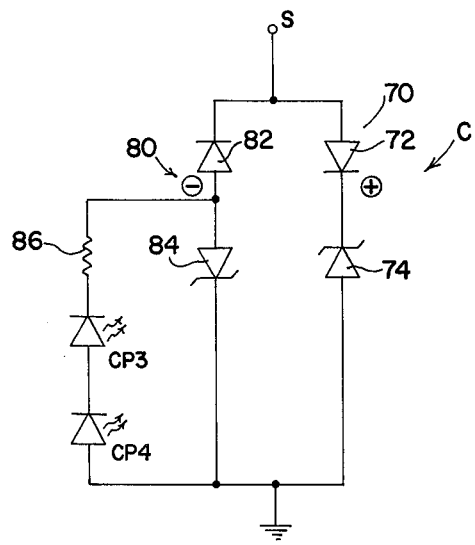
FIG. 4 is a schematic wiring diagram illustrating the sense circuit used in the preferred embodiment of the present invention.

Referring now to FIG. 4, the sense circuit C of FIG. 1 is shown separately and includes a light coupling of somewhat standard construction. These couplings identified in the figures as CP are each identified by subscript and include two halves. One half is a light source such as a LED and the second half is a light sensitive conductive member. In practice, these two elements are provided on a common matrix which provides heat stability and uniform operation. The arrows for the various light couplings indicate whether the coupling is transmitting a light or is receiving a light to be rendered conductive thereby. With this nomenclature, the sense circuit includes a branch 70 which is a drain when a positive half cycle is introduced at sense point S. This drain branch includes a diode 72 and a Zener diode 74. Thus, during the positive half cycles, current is drained through branch 70 to the chassis ground as indicated in the figures.

During the negative half cycle of the sense signal, control branch 80 of sense circuit C is actuated. This branch includes diode 82 and Zener diode 74. In parallel across the Zener diode is an actuating circuit including a dropping resistor 86 and the light emitting portions of CP3, CP4. The function of these light emitting elements is to energized light receiving conducting elements having corresponding numbers, as will be described later. In summary, the sense circuit C of FIGS. 1 and 4 is responsive only to a negative half cycle in the field winding discharge circuit B, as shown in FIG. 3. As will be apparent later, the control device of the present invention is responsive only to the negative half cycle for resetting and initiating a counting interval. Operation continues when there is a lack of a negative half cycle. This has advantages which will be apparent from the following description since a positive half cycle is not required to operate the contrl device. As long as there is a $V_{DD}$ voltage and a lack of a negative half cycle, the control device will function.

POWER SUPPLY AND ON-OFF SWITCHING CIRCUIT

Figure 5:
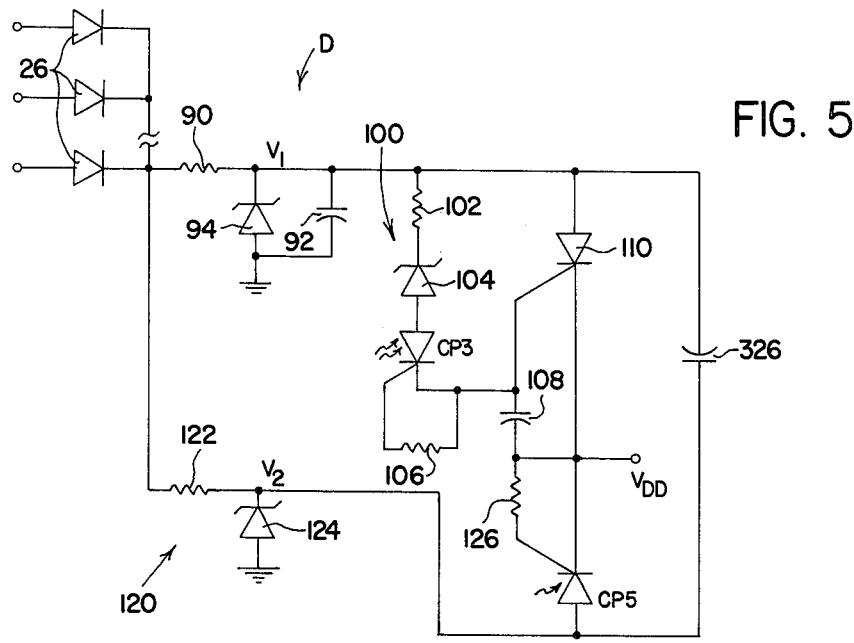
FIG. 5 is a schematic wiring diagram illustrating the power supply and on and off circuit of the preferred embodiment of the present invention.

Referring now more particularly to FIG. 5, the power supply for creating the driving voltage $V_{DD}$ for the control device is schematically illustrated. The rectifier 26 providesa rectified D.C. voltage which is regulated by resistor 90, capacitor 92 and Zener diode 94. The on circuit 100 is responsive to CP3 of the sense circuit. Thus, the light responsive conductive element CP3 of the on circuit 100 actuates this circuit. A resistor 102 and Zener diode 104 control the voltage across CP3. A noise limiting resistor 106 is provided for CP3 in accordance with standard design practice. A capacitor 108 provides a holding element for SCR 110. When light is emitted during a negative half cycle by CP3 of the sensing circuit, the circuit including CP3 in FIG. 5 is rendered conductive. This applies a voltage to the gate of SCR 110 so that the gate is conductive and a regulated voltage is applied at the $V_{DD}$ line, as shown in FIG. 5. The voltage across capacitor 108 prevents commutation of SCR 110 after it has been turned on by circuit 100. Thus, when the control device of the preferred embodiment is actuated by the first negative half cycle applied across sense circuit C, the device is turned on and held on by SCR 110, and control voltage $V_{DD}$ is maintained. As soon as slip is experienced in the motor, the control unit is turned on for monitoring and control purposes. To turn the unit off, there is provided a circuit 120 also shown in FIG. 5 which includes a voltage regulating network and high impedance resistor 122 and Zener diode 124. When CP5 receives a turn off signal at the end of the control cycle, to be explained later, CP5 of FIG. 5 is rendered conductive. This applies a voltage $V_2$ onto the cathode side of SCR 110. This commutates SCR 110 to the non-conductive condition. To accomplish this, $V_2$ is substantially greater than $V_1$. After SCR 110 has been turned off, the current path of rectifier 26 passes through resistor 122. This resistor is relatively large. In the preferred embodiment a resistance of 2.7 Megohms is provided.

Thus, current flow through this resistor is not great enough to retain the conductive condition of CP5, as shown in FIG. 4. Thus there is no established current through this light responsive element to the main power line of the control device. Resistor 126 is used as a noise suppressant element for CP5. Thus, as soon as SCR 110 is turned on it remains on until CP5 turns the control device off. On successive negative half cycles additional signals are received attempting to turn on SCR 110; however, as long as it is on, these signals have no effect.

DIGITAL COUNTER AND LOGIC CIRCUIT

Figure 6:
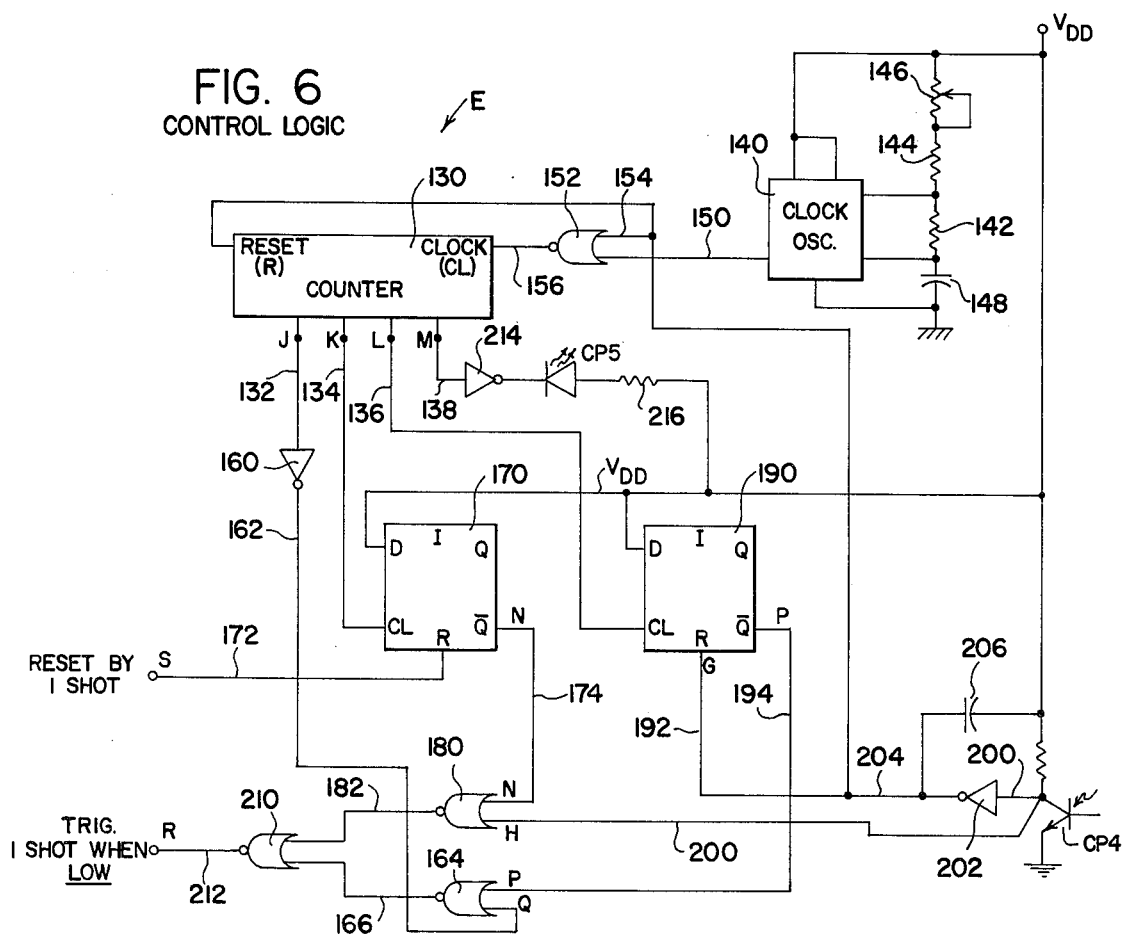
FIG. 6 is a schematic wiring and logic diagram illustrating the counter and control logic circuit used in the preferred embodiment of the present invention.

Referring now to FIG. 6, the digital counter and logic circuit E is illustrated in detail and separately from FIG. 1. A digital counter 130 of the integrated circuit type using field-effect transistors or similar control gates has somewhat standard output terminals providing output signals or pulses as the digital counter progresses. In the illustrated embodiment, the digital counter is arranged with the least significant outputs to the left. Thus, the outputs on the left provide output signals or pulses at various counts in accordance with standard digital counter technology. As illustrated, twelve outputs are provided; however, various digital counters could be used. In the illustrated embodiment, output lines 132, 134, 136 are arranged in least to most significant outputs. Thus, line 132 is pulsed somewhat rapidly compared to the other lines. In practice, as best shown in FIG. 1, line 132 is connected by a jumper to terminals 4 or 5. When connected to terminal 4, a pulse is received in line 132 approximately each sixteen counts in a given counting interval between resetting. Line 134 is connected by a jumper to position 5. Thus, a pulse is received in line 134 every thirty two counts. Line 136 is connected by a jumper to position 7 or 8. When connected to position 7, a pulse is received in line 136 each 128 counts. Line 138 is connected to position 10. Thus, a pulse is received in line 138 each 1024 counts. These figures are given only as representations of the general arrangement of lines 132, 134, 136 and 138. Obviously, these can be adjusted according to different desired times and according to the rate of the incoming pulese to be counted. Basically, line 132 is pulsed somewhat rapidly. Line 134 is pulsed only when the slip of the motor is sufficiently small for pulling in the motor by synchronous operation. Line 136 is pulsed at a rate which is indicative of zero slip when the motor is running in synchronous. Line 138 is pulsed when it is desired to turn off the control device. These functions will be explained in connection with the logic of circut E.

To drive counter 130, there is provided an adjustable RC oscillator 140 having a voltage divider formed from resistors 142, 144 and rheostat 146. Capacitor 148 combines with the resistors to determine the rate of the output pulse train in line 150. Rheostat 146 is adjusted to change the pulsing rate of oscillator 140 in accordance with standard practice. A NOR gate 152 receives the pulse train on line 150 and is provided with an inhibiting input 154 and an output 156 connected to the clocking input of counter 130. The pulsing output 132 is connected through an inverter 160 to the input of a pulsating NOR gate 164 by line 162. This NOR gate has an output 166. A speed responsive flip-flop 170 of the D type includes a D terminal connected to the $V_{DD}$ line which is a logic 1. The R terminal is connected to line 172 which is directed from a one-shot device, which will be described later. After the one-shot device energizes the SCRs 30, 32 it resets flip-flop 170 for purposes to be explained. The CL terminal of flip-flop 170 is connected to the second line 134 from counter 130. Thus, when a pulse is received in line 134 flip-flop 170 is clocked to transfer the logic 1 from the D terminal to the Q terminal. The $\overline{Q}$ terminal is connected to line 174 which directs the inverted logic of flip-flop 170 to the input of zero NOR gate 180 having an output 182.

The zero flip flip-flop 190 is also a D type flip-flop wherein the D terminal is connected to the $V_{DD}$ line. The R terminal of this flip-flop is connected to line 192 which resets flip-flop 190 upon each negative half cycle, as will be described later. The CL terminal of flip-flop 190 is connected to line 136 so that as a pulse is received in this line the logic of the D terminal is transferred to the Q terminal. The $\overline{Q}$ terminal is connected to line 194, which is the second input to the pulsing NOR gate 164. When a logic zero is applied in line 194, line 132 can create the pulsing output in line 166 for a purpose to be described. To control the operation of circuit E shown in FIG. 6, there is provided a control line 200, the logic of which is determined by the conductive condition of CP4. During the negative half cycle, CP4 is conductive which provides a logic zero in line 200. This releases gate 180 and provides a logic 1 at the output of the inverter 202. This output, which is line 204, is connected to the reset line 192 of zero slip flip-flop 190 and the inhibiting input 154 of gate 152. Further, line 204 is connected to the reset terminal R of counter 130. Thus, upon each negative half cycle, counter 130 is reset to start a new counting interval, gate 152 is inhibiting and zero slip flip-flop 190 is set to a logic zero with a logic 1 at the $\overline{Q}$ terminal 194. This inhibits gate 164 to prevent operation of output 166.

The trigger control gate 210 has inputs 166, 182 both of which are normally logic zero. Thus, a logic 1 normally appears at the output 212 of NOR gate 210. When a logic 0 appears in output 212, in a manner to be described later, the SCRs 30, 32 are gated to direct D.C. voltage across field winding 12.

When a pulse is received in line 138 the counting interval is substantially long and a logic 0 appears at the output of inverter 214. This renders conductive the CP5 light emitting element through a voltage drop resistor 216. As mentioned in connection with the circuit of FIG. 5, actuation of CP5 turns the control unit off and retains it in the off condition awaiting a new negative half cycle of an alternating sense signal at point S in the sense circuit C, shown in FIG. 4.

Referring now to the operation of the counter and control logic circuit shown in FIG. 6, when the motor is first started, slip is extensive; therefore, the induced alternating current and high voltage in discharge circuit B commutates the SCRs 30, 32 to an off condition. In addition, the slip frequency is quite large and negative half cycles appear often in the sense signal. When a negative half cycle is received by the sense circuit, the control device is turned on by CP3 and line 200 becomes a logic 0. An appropriate indicator light can be used to indicate when the sense circuit is receiving a signal and when the $V_{DD}$ is on. A high logic on line 204 at the negative half cycle resets counter 130, blocks gate 152 and resets zero slip flip-flop 190. Thus, by adjusting the rheostat 146 and the position of line 134, the necessary counts to pulse line 134 are not reached during a counting interval between successive resets.

Thus, the motor operates in an induction mode. This operation continues until a predetermined low slip has been reached. In practice low slip is approximately 5%. At that time, the spacing between successive negative half cycles is sufficiently large to allow a pulse in line 134 during a timing interval determined by successive resetting pulses in line 204. When a pulse is received in line 134 because of a relatively low existing slip of the rotor, speed flip-flop 170 is clocked by line 134. This transfers the logic 1 from the D terminal to the Q terminal. A logic zero then appears in line 174 to release gate 180. A logic 1 remains in line 200 because the counting interval is defined by the absence of a negative half cycle. As soon as the next negative half cycle appears, line 200 shifts to a logic zero. Thus, lines 174, 200 are both at logic zero. This produces a logic 1 in line 182. This logic 1 appears at approximately the zero crossing when the negative half cycle first appears. The logic 1 in line 182 produces at logic 0 in line 212. As previously mentioned, this causes a turn on signal for the SCRs 30, 32 in a manner to be described later. This applies a D.C. voltage from the excitation circuit 20 across rotor field winding 12. When the SCRs are turned on, a logic 1 appears in line 172 as will be discussed later to reset flip-flop 170 so that a logic 1 again appears in line 174. Thus, during each successive counting interval determined by spacing between successive negative half cycles, an actuation pulse is created by line 134 in line 212. This is repeated until the slip of the motor is decreased to a zero slip which indicates synchronization. At that time there is no negative half cycle and counter 130 continues to run. This provides sufficient time to count to the level producing a pulse in line 136. If there is no synchronization, the timing interval does not have a sufficient length to create a pulse in this line. When line 136 is pulsed, zero slip flip-flop 190 is clocked to produce a logic zero in line 194. This releases pulsing NOR gate 164 so that output 166 is pulsed rapidly by the pulses created in line 132. This causes a series of rapidly reappearing triggering pulses in line 212. In accordance with this aspect of the invention, when zero slip has been reached, the SCRs are turned on repeatedly to assure synchronous operation even if the D.C. voltage is applied when there is synchronization at improper poles. In this condition, if the SCRs are turned on the D.C. field in winding 12 snaps the poles into proper alignment. This induces a back emf that can commutate SCRs 30, 32. Without a subsequent pulse to reestablish the conductivity of the SCRs, the snychronous mode is not retained.

If there is zero slip, there is no longer an alternating sense signal; therefore, there is no negative half cycle to reset counter 130. For that reason, the counter continues to count until a pulse is received in line 138. This actuates CP5 to turn off the control waiting for a new slip condition. If a load or other environment causes slip after synchronization is realized, the control circuit is turned on again and, according to the amount of slip, the circuit of FIG. 6 is reenergized to control the D.C. excitation current supply to automatically shift between induction and synchronous operation.

TRIGGER CIRCUIT

Figure 7:
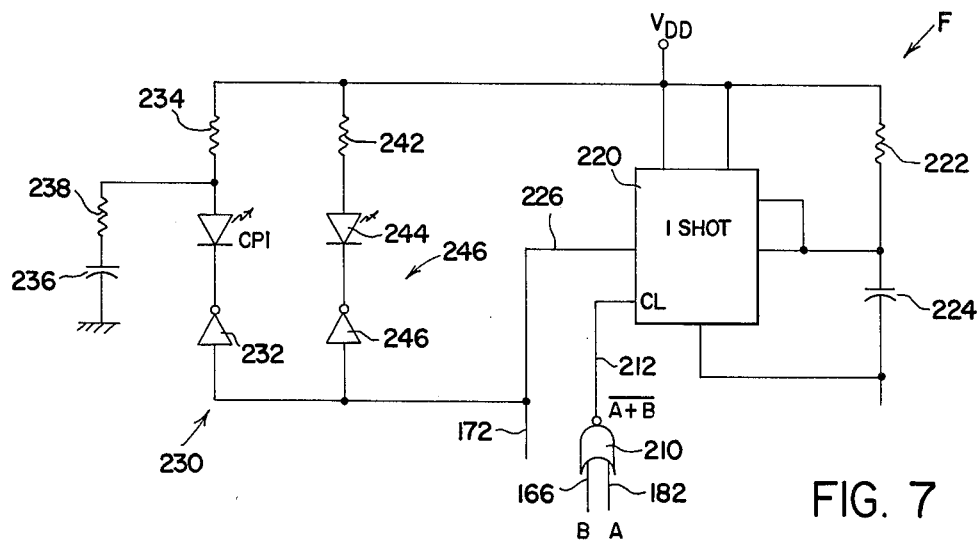
FIG. 7 is a schematic wiring diagram illustrating the triggering circuit used in the preferred embodiment of FIG. 1 together with an indicator branch.
Figure 8:
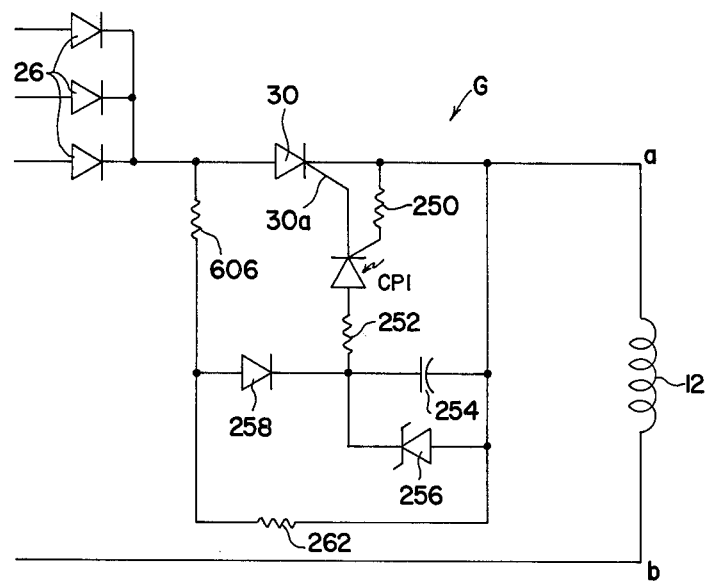
FIG. 8 is a schematic wiring diagram illustrating the current source and one SCR switching circuit used in the preferred embodiment of the present invention; and, FIG. 9 is a schematic voltage graph illustrating generally the operating characteristics of the preferred embodiment of the present invention.

Referring now to FIG. 7, the trigger circuit F is illustrated separately and includes a standard single shot device 220 controlled by a resistor 222 and a capacitor 224. When a logic 0 is received by the clocking terminal CL through line 212, a logic 1 pulse is created in line 226. Also, a logic 1 is created in line 172 for resetting the speed flip-flop 170, as previously described. When a logic 1 appears in line 226, the SCR turn on circuit 230 is energized. This circuit can take a variety of forms; however, in the illustrated embodiment, the inverter 232 inverts the logic 1 to a logic 0. This grounds CP1 to create current flows through CP1 and resistor 234 to energize the corresponding light conducting CP1 element of FIG. 8. Capacitor 236 stores energy for continued operation of CP1 for a short time to assure turn on of SCRs 30, 32. Also, by providing a capacitor with resistor 238, no false pulse is created by the first establishment of the voltage on line $V_{DD}$ when power is first applied to the control device. This produces a positive turn on signal only when a logic 0 appears in line 212. Although not appearing in FIG. 1, FIG. 7 illustrates a second parallel indicator 240 controlled by the logic on line 226. This branch includes a resistor 242 and LED 244 and inverter 246. Thus, when a pulse is received for turning on the SCRs, LED 244 is pulsed. This circuit can be used to further initiate a second indicator arrangement to indicate that the control device of the present invention has been actuated. This may be helpful in reducing the load on the motor to prevent slip during normal operation. Of course, various indicators could be provided for monitoring the circuits described in this application.

CURRENT SOURCE AND SCR SWITCHING CIRCUIT

Referring now to FIG. 1, two switching circuits G are used for separately turning on the individual SCRs 30, 32. One of these switching circuits is illustrated schematically in FIG. 8 wherein actuation of CP1 in FIG. 7 causes conduction of CP1 in FIG. 8. A resistor 250 stabilizes the operation of this light sensitive conductive element. Resistor 252 connects capacitor 254 with the anode of CP1. A Zener diode 256 controls the voltage across capacitor 254. A diode 258 determines the charging circuit for capacitor 254 through resistor 260 as shown in FIG. 1. The capacitor 254 is discharged when CP1 is conductive to provide a gating current for gate 30a. Since a capacitor is used for the gating current, a sufficient time is required to charge capacitor 254 in between successive pulses. Since the capacitor is charged from the excitation circuit, there is always sufficient energy for commutating the SCRs into conduction between successive turn on pulses received by CP1 of FIG. 8. In addition, the control device need not have sufficient current capabilities to gate the SCRs.

The second circuit for turning on SCR 32 is shown in FIG. 1. Like components are designated by the subscript a. As shown in FIG. 1, the first circuit includes a second light coupling element CP2 controlled by resistor 270. This coupling energizes CP2 of the second switching circuit which corresponds to CP1 of the first mentioned switching circuit. Thus, after CP1 has initiated the first switching circuit, CP2 initiates the second switching circuit. Resistors 264, 266 combine with resistors 260, 262 to provide a voltage divider arrangement for charging capacitors 254, 254a and provide the turn on current for SCRs 30, 32.

PULSING FORMS AND OPERATIONS

Figure 9:
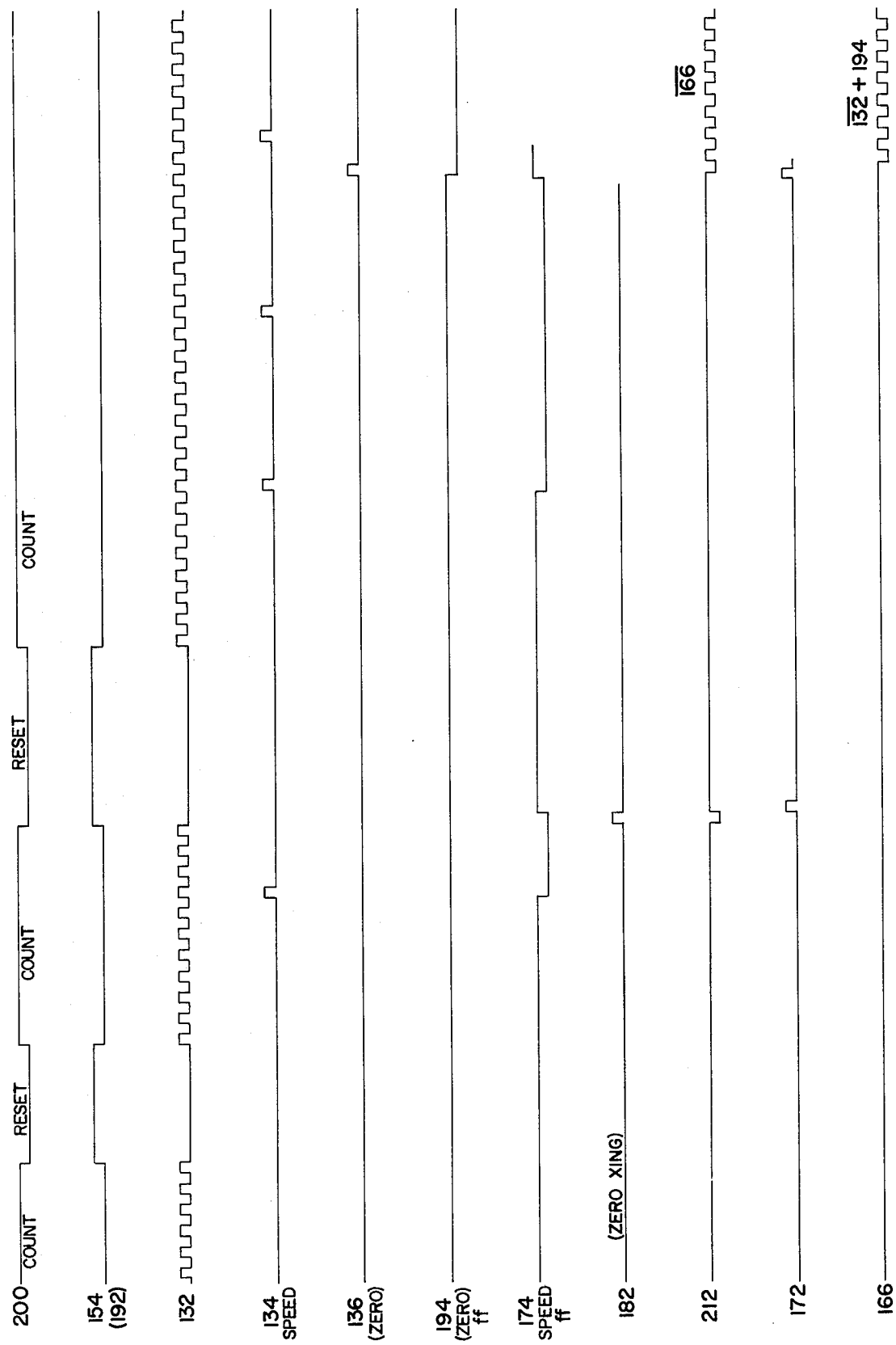

Referring now to FIG. 9, the various logic conditions of the components shown in FIG. 1 are illustrated somewhat graphically to show generally the operating characteristics of the preferred embodiment of the invention. It is noted that when the zero slip flip-flop has been clocked, a series of pulses are created in line 212 for the purposes previously described.

The preferred embodiment of the invention counts pulses whenever there is no negative half cycle. Thus, there is no need for a positive half cycle to create a counting interval. For that reason, control is positive over the control device and a positive turn off is realized after a preselected period of time of synchronous operation. The general operation of the preferred embodiment as schematically illustrated in FIG. 9 is apparent from the description of the operation of the several components as described in the individual sections above.

Having thus defined the invention, it is claimed:

1. A control device for a synchronous motor having a stator, a rotor, a field-winding discharge circuit with a slip induced current generally alternating between positive and negative half cycles and having a frequency directly dependent upon the slip between the rotating energizing field of said stator and the rotational movement of said rotor, a field-winding excitation circuit and means for deactivating said excitation circuit when said slip induced current flows in said discharge circuit, said device comprising: a digital counter means for creating an output signal when said counter means has counted a selected number of pulses during a counting interval; means for creating counting pulses having a set frequency; directing means for directing said counting pulses to said counter means; resetting means responsive to one of said half cycles for resetting said counter, whereby said resetting means terminates a counting interval of said counter means; means responsive to a lack of said one half cycle to allow said counter means to count toward said selected number; control means responsive to said output signal for activating said excitation circuit, means for creating a control signal when said counter means counts beyond said selected number to a higher number of means responsive to said control signal for activating said excitation circuit.

2. A device as defined in claim 1 including a source of control voltage for said control device; means for connecting said source to said control device; means for disconnecting said source from said control circuit; and means responsive to at least one of said half cycles for actuating said connecting means.

3. A device as defined in claim 1 wherein said directing means includes a logic gate and means responsive to the creation of said one of said half cycles for inhibiting said logic gate.

4. A device as defined in claim 1 wherein said control means includes a logic gate, means for inhibiting said logic gate until said output signal is created by said counter means, means for actuating said logic gate when said alternating current shifts to one of said half cycles; and means responsive to actuation of said logic gate for activating said excitation circuit.

5. A device as defined in claim 1 wherein said control device is mounted on said rotor.

6. A device as defined in claim 1 wherein said directing means includes a logic gate and means responsive to said resetting means for inhibiting said logic gate.

7. A device as defined in claim 1 wherein said excitation circuit includes an SCR with a gate and a D.C. power source and said control means for activating said excitation circuit includes means for gating said SCR to apply said D.C. source said field-winding.

8. A device as defined in claim 7 whrein said gating means includes a capacitor connected to said gate, means for charging said capacitor and means reponsive to said output signal for discharging said capacitor through said gate.

9. A control device for a synchronous motor having a stator, a rotor, a field-winding discharge circuit with a slip induced current generally alternating between positive and negative half cycles and having a frequency directly dependent upon the slip between the rotating energizing field of said stator and the rotational movement of said rotor, a field-winding excitation circuit and means for deactivating said excitation circuit when said slip induced current flows in said discharge circuit, said device comprising: a digital counter means for creating an output signal when said counter means has counted a selected number of pulses during a counting interval; means for creating counting pulses having a set frequency; directing means for directing said counting pulses to said counter means; resetting means responsive to one of said half cycles for resetting said counter, whereby said resettin means terminates a counting interval of said counter means; means responsive to a lack of said one half cycle to allow said counter means to count toward said selected number; control means responsive to said output signal for activating said excitation circuit; a source of control voltage for said control device; means for connecting said source to said control device; means for disconnecting said source from said control circuit; and means responsive to at least one of said half cycles for actuating said connecting means, said counter means including means for creating a second output signal when said counter means has counted to a second number substantially greater than said selected number of pulses during a counting interval; and, means responsive to said second output signal for actuating said disconnecting means.

10. A device as defined in claim 9 wherein said counter means includes means for creating a third output signal when said counter means has counted to a third number of pulses greater than said selected number of pulses and less than said second number of pulses during a counting interval; and means responsive to third output signal for activating said excitation circuit.

11. A device as defined in claim 10 including means responsive to said third output signal for repeatedly activating said excitation circuit prior to said second output signal.

12. A control device for a synchronous motor having a stator, a rotor, a field-winding discharge circuit with a slip induced current generally alternating between positive and negative half cycles and having a frequency directly dependent upon the slip between the rotating energizing field of said stator and the rotational movement of said rotor, a field-winding excitation circuit and means for deactivating said excitation circuit when said slip induced current flows in said discharge circuit, said device comprising: a digital counter means for creating an output signal when said counter means has counted a selected number of pulses during a counting interval; means for creating counting pulses having a set frequency; directing means for directing said counting pulses to said counter means; resetting means reponsive to one of said half cycles for resetting said counter, whereby said resetting means terminates a counting interval of said counter means; means responsive to a lack of said one half cycle to allow said counter means to count toward said selected number; and control means responsive to said output signal for activating said excitation circuit, said counter means including means for creating another output signal when said counter means has counted during a counting interval to a number greater than said selected number and indicative of substantially zero slip between said rotating energizing field and said rotational movement of said rotor; and means responsive to said another output signal for activating said excitation circuit.

13. A device as defined in claim 12 including means responsive to said another output signal for repeatedly activating said excitation circuit.

14. A device as defined in claim 13 including means controlled by said counter means for turning said control device off after said another output signal.

15. A device as defined in claim 12 including means controlled by said counter means for turning said control device off after said another ouput signal.

16. A control device for a synchronous motor having a stator, a rotor, a field-winding discharge circuit with a slip induced current alternating at a frequently directly dependent upon the slip between the rotating energizing field of said stator and the rotation of movement of said rotor; a field-winding excitation circuit; and means for deactivating said excitation circuit when current flows in said discharge circuit; said device comprising: a digital counter means for creating an output signal when said counter means has counted a selected number of pulses during a counting interval; means for creating counting pulses having a set frequency; directing means for directing said counting pulses to said counter means; resetting means for resetting said counter means in response to said slip induced current and at a rate determined by said current frequency, means responsive to a lack of said slip induced current for allowing said counter means to count to said selected number; means responsive to said output signal for activating said excitation circuit, means for creating a control signal when said counter means counts beyond said selected number to a higher number and means responsive to said control signal for deactivating said pulse counting means.

17. A device as defined in claim 16 including a source of control voltage for said control device; means for connecting said source to said control device; means for disconnecting said source from said control circuit; and means responsive to said slip induced current for actuating said connecting means.

18. A device as defined in claim 16 including a source of control voltage for said control device; means for connecting said source to said control device; means for disconnecting said source from said control circuit; and means responsive to the lack of said slip induced current for actuating said disconnecting means.

19. A device as defined in claim 16 wherein said control device is mounted on said rotor.

20. A device as defined in claim 16 wherein said directing means includes a logic gate and means responsive to said resetting means for inhibiting said logic gate.

21. A device as defined in claim 16 wherein said excitation circuit includes an SCR with a gate and a D.C. power source and said control means for activating said excitation circuit includes means for gating said SCR to apply said D.C. source across said field-winding.

22. A device as defined in claim 21 wherein said gating means includes a capacitor connected to said gate, meand for charging said capacitor and means responsive to said output signal for discharging said capacitor through said gate.

23. A control device for a synchronous motor having a stator, a rotor, a field-winding discharge circuit with a slip induced current alternating at a frequency directly dependent upon the slip between the rotating energizing field of said stator and the rotation of movement of said rotor; a field-winding excitation circuit; and means for deactivating said excitation circuit when current flows in said discharge circuit; said device comprising: a digital counter means for creating an output signal when said counter means has counted a selected number of pulses during a counting interval; means for creating counting pulses having a set frequency; directing means for directing said counting pulses to said counter means; resetting means for resetting said counter means in response to said slip induced current and at a rate determined by said current frequency, means responsive to a lack of said slip induced current for allowing said counter means to count to said selected number; means responsive to said output signal for activating said excitation circuit, and means responsive to said output signal for activating said excitation circuit at least twice in succession.

24. A control device for a synchronous motor having a stator, a rotor, a field-winding discharge circuit with a slip induced current alternating at a frequency directly dependent upon the slip between the rotating energizing field of said stator and the rotation of movement of said rotor; a field-winding excitation circuit; and means for deactivating said excitation circuit when current flows in said discharge circuit; said device comprising: a digital counter means for creating an output signal when said counter means has counted a selected number of pulses during a counting interval; means for creating counting pulses having a set frequency; directing means for directing said counting pulses to said counter means; resetting means for resetting said counter means in response to said slip induced current and at a rate determined by said current frequency, means responsive to a lack of said slip induced current for allowing said counter means to count to said selected number; means responsive to said output signal for activating said excitation circuit, means for establishing said counting interval in response to said resetting rate with said interval initiated and terminated by successive resetting by said resetting means, said counter means including means for creating a second output signal when said counter means counts to a given number between two successive resettings; and means responsive to said second output signal for activating said excitation circuit.

* * * * *